(12) United States Patent
Lee et al.

(10) Patent No.: US 7,821,458 B2
(45) Date of Patent: Oct. 26, 2010

(54) APPARATUS AND METHOD FOR LOCATING A TERMINAL IN A BROADBAND WIRELESS COMMUNICATION SYSTEM

(75) Inventors: Jun-Sung Lee, Seoul (KR); Jin-Han Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 11/965,058

(22) Filed: Dec. 27, 2007

(65) Prior Publication Data

US 2008/0158060 A1    Jul. 3, 2008

(30) Foreign Application Priority Data

Dec. 29, 2006  (KR) ...................... 10-2006-0137683

(51) Int. Cl.
   *G01S 3/02*   (2006.01)
   *G01S 5/04*   (2006.01)
(52) U.S. Cl. .................. 342/465; 342/442; 342/458
(58) Field of Classification Search .............. 342/442, 342/450, 457, 458, 463, 465; 455/456.1, 455/457
   See application file for complete search history.

(56) References Cited

FOREIGN PATENT DOCUMENTS

| KR | 10-2004-0092610 A | 11/2004 |
|---|---|---|
| KR | 10-2007-0084848 A | 8/2007 |
| KR | 10-0754548 B1 | 8/2007 |
| WO | 02/059638 A2 | 8/2002 |

*Primary Examiner*—Dao L Phan
(74) *Attorney, Agent, or Firm*—Jefferson IP Law, LLP

(57) ABSTRACT

An apparatus and method for locating a terminal in a broadband wireless communication system are provided. The apparatus for locating the terminal includes a candidate region determiner, a virtual location determiner, and a final location determiner. The candidate region determiner determines a candidate region of the terminal by using tag signal arrival time information of the terminal provided from a plurality of readers. The virtual location determiner determines a virtual location of the terminal in the candidate region in consideration of a propagation delay of the tag signal. The final location determiner predicts a tag signal arrival time from the virtual location and determines the virtual location as the final location if a difference between the predicted tag signal arrival time and a measured tag signal arrival time is less than or equal to a threshold value. The apparatus and method provide a less expensive and less complex locating system.

16 Claims, 7 Drawing Sheets

APPARATUS AND METHOD FOR LOCATING A TERMINAL IN A BROADBAND WIRELESS COMMUNICATION SYSTEM

PRIORITY

This application claims the benefit under 35 U.S.C. §119 to a Korean patent application filed in the Korean Intellectual Property Office on Dec. 29, 2006 and assigned Serial No. 2006-137683, the entire disclosure of which is hereby incorporated by reference.

BACKGROUND OF THE INVENTION

1. Field of the Invention

The present invention relates generally to a broadband wireless communication system. More particularly, the present invention relates to an apparatus and method for locating a terminal in a broadband wireless communication system.

2. Description of the Related Art

Extensive research is being conducted to provide various Quality of Service (QoS) features with a data rate of about 100 Mbps in the advanced fourth-generation (4G) communication system. The 4G communication system is evolving to provide mobility, high data rate transmission, and high QoS in a broadband wireless access (BWA) communication system such as a local area network (LAN) system and a metropolitan area network (MAN) system.

Users can be provided with various services using communication systems, such as the 4G communication system, which provide mobility and a high data transmission rate. For example, the above communication systems can be used to construct a real-time location system (RTLS) for informing of the location of a terminal. Examples of a conventional communication system-based location scheme are a global positioning system (GPS)-based location scheme and a triangulation technique-based location scheme.

However, the GPS-based location scheme requires that a mobile station must have a chip for receiving GPS signals. Also, the triangulation technique-based location scheme has a large location error and is very complex to implement. Examples of the triangulation technique-based location scheme are a Time Of Arrival (TOA) location scheme and a Received signal strength Of Arrival (ROA) location scheme. However, the TOA location scheme requires highly accurate time synchronization for all mobile stations and the ROA location scheme requires experimental information about signal transmission channels.

As described above, because the conventional GPS-based location scheme requires a GPS signal receiving chip in a mobile station, it increases the structural complexity and cost of a mobile station. Also, because the conventional triangulation technique location scheme requires accurate time synchronization and channel information acquisition, it is difficult to implement and is susceptible to error.

SUMMARY OF THE INVENTION

An aspect of the present invention is to address at least the above-mentioned problems and/or disadvantages and to provide at least the advantages described below. Accordingly, an aspect of the present invention is to provide an apparatus and method for locating a terminal in a broadband wireless communication system without using additional equipment.

Another aspect of the present invention is to provide an apparatus and method for locating a terminal in a broadband wireless communication system on the basis of a difference in signal arrival time considering a signal propagation delay.

According to one aspect of the present invention, an apparatus for locating a terminal in a broadband wireless communication system is provided. The apparatus includes a candidate region determiner for determining a candidate region of a terminal by using tag signal arrival time information of the terminal provided from a plurality of readers, a virtual location determiner for determining a virtual location of the terminal in the candidate region in consideration of a propagation delay of the tag signal and a final location determiner for predicting a tag signal arrival time from the virtual location and for determining the virtual location as the final location if a difference between the predicted tag signal arrival time and a measured tag signal arrival time is less than or equal to a threshold value.

According to another aspect of the present invention, a terminal in a broadband wireless communication system is provided. The terminal includes a generator for generating a tag signal, a mapper for mapping the tag signal to a DC subcarrier and a communication unit for transmitting a symbol containing the tag signal.

According to still another aspect of the present invention, a method for locating a terminal in a broadband wireless communication system is provided. The method includes determining a candidate region of the terminal by using tag signal arrival time information of the terminal provided from a plurality of readers, determining a virtual location of the terminal in the candidate region in consideration of a propagation delay of the tag signal, predicting a tag signal arrival time from the virtual location, calculating a difference between the predicted tag signal arrival time and a measured tag signal arrival time and determining the virtual location as the final location if the difference between the predicted tag signal arrival time and the measured tag signal arrival time is less than or equal to a threshold value.

According to even another aspect of the present invention, a method for a terminal to transmit a tag signal in a broadband wireless communication system is provided. The method includes generating a tag signal, mapping the tag signal to a DC subcarrier and transmitting a symbol containing the tag signal.

According to yet another aspect of the present invention, a broadband wireless communication system is provided. The system includes a terminal for transmitting a TX signal generated by mapping a tag signal to a DC subcarrier, a plurality of readers for receiving the TX signal to detect the tag signal mapped to the DC subcarrier and to detect the arrival time of the tag signal and a location unit for determining a candidate region of the terminal by using tag signal arrival time information provided from the readers, for predicting a tag signal arrival time from a virtual location in the candidate region and for determining the virtual location as the final location if a difference between the predicted tag signal arrival time and a measured tag signal arrival time is less than or equal to a threshold value.

BRIEF DESCRIPTION OF THE DRAWINGS

The above and other aspects, features and advantages of certain exemplary embodiments of the present invention will be more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide an apparatus and method for locating a terminal in a broadband wireless communication system on the basis of a difference in time of arrival of a tag signal from the terminal. The following description is made in the context of an orthogonal frequency division multiplexing (OFDM) communication system. However, the present invention is not limited to this system and it is to be clearly understood that the present invention is applicable to any other multi-carrier communication system.

Figure 1:
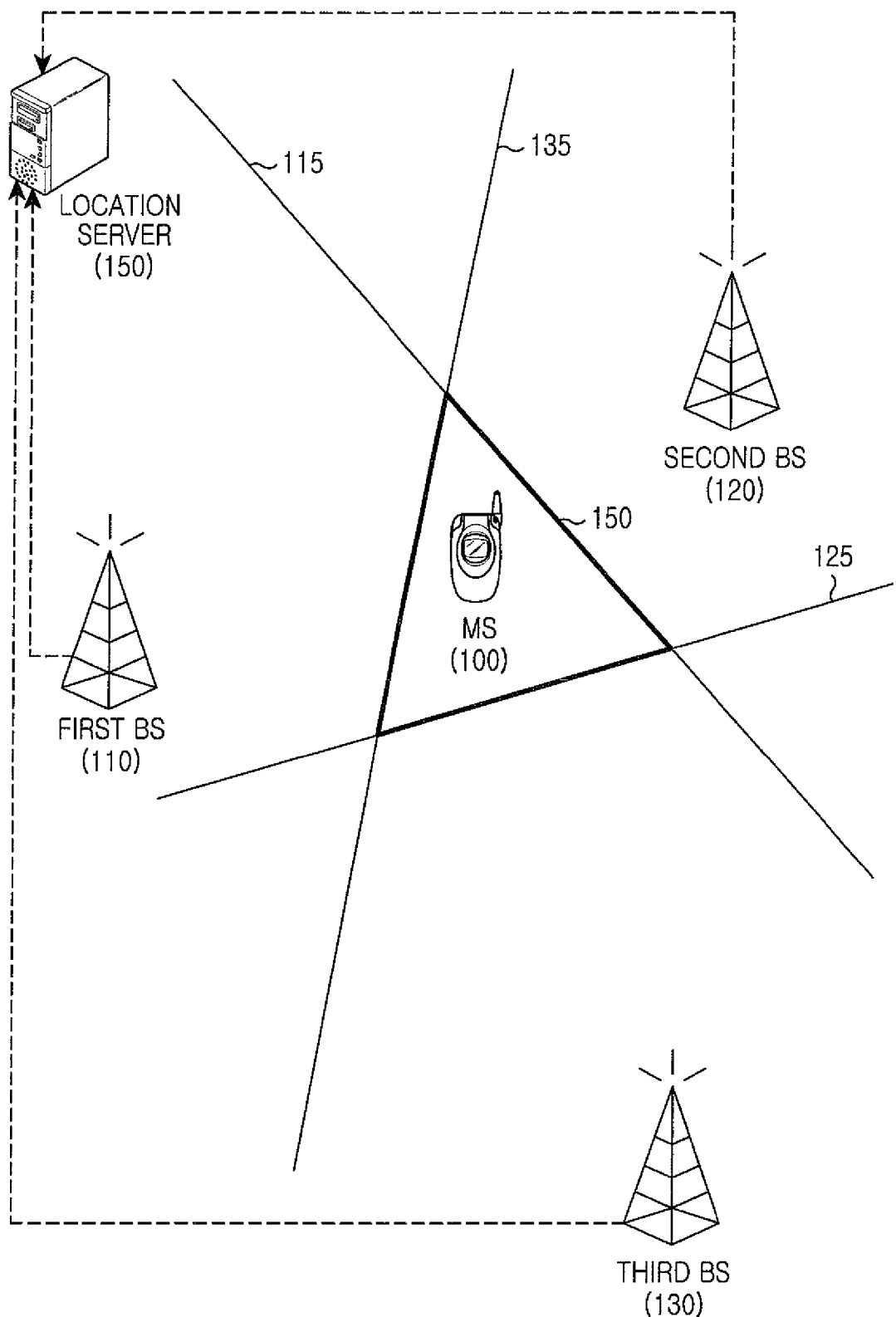
FIG. 1 is a diagram illustrating a candidate region for location of a terminal in a broadband wireless communication system according to an exemplary embodiment of the present invention.

FIG. 1 is a diagram illustrating a candidate region for location of a terminal in a broadband wireless communication system according to an exemplary embodiment of the present invention.

First, an algorithm according to an exemplary embodiment of the present invention will be described with reference to the following Equations.

To determine the location of a terminal, the terminal transmits an agreed signal, which is called a tag signal, for every OFDM symbol. The tag signal is transmitted using a direct current (DC) subcarrier among subcarriers in the OFDM symbol, and is modulated using Bark codes. The Bark code is a reference signal that is designed to reduce an interference with a general communication signal. Bark codes have both a near-zero inner product and a good correlation therebetween.

A tag reader receives a tag signal from the terminal, and detects the time of arrival of the received tag signal. To determine the location of the terminal, at least three tag readers must receive the tag signal. In order to locate the terminal in the BWA communication system without using additional equipment, a base station (BS) functions as the tag reader in an exemplary implementation. Thus, an exemplary embodiment of the present invention will be described wherein that the tag reader is a base station.

Referring to FIG. 1, a first base station 110, a second base station 120 and a third base station 130 each receives a tag signal from a terminal 100. After receiving the tag signal, each of the first base station 110, second base station 120 and third base station 130 respectively informs a location server 150 of information about the time of arrival of the received tag signal. The location server 150 is capable of communicating with a plurality of base stations and may be provided in any of the base stations or may be a stand-alone device.

The location server 150 calculates a tag signal arrival time difference between each pair of the base stations using the tag signal arrival time information received from the base stations 110, 120 and 130. That is, the location server 150 calculates a tag signal arrival time difference between the first base station 110 and the second base station 120, a tag signal arrival time difference between the second base station 120 and the third base station 130, and a tag signal arrival time difference between the third base station 130 and the first base station 110. The tag signal arrival time differences are used to determine a candidate region where the terminal may be located. That is, the candidate region is determined by location curves calculated using the tag signal arrival time differences. The location curves can be calculated using Equation (1):

$$R(i, j) = \frac{\sqrt{(X - X_i)^2 + (Y - Y_i)^2}}{C} - \frac{\sqrt{(X - X_j)^2 + (Y - Y_j)^2}}{C} \quad (1)$$

where R(i,j) denotes a tag signal arrival time difference between two base stations, $X_i$ and $Y_i$ denote the coordinates of a base station i, $X_j$ and $Y_j$ denote the coordinates of a base station j, and C denotes the speed of light.

Equation (1) is used to calculate a first location curve 115 between the first base station 110 and the second base station 120, a second location curve 125 between the second base station 120 and the third base station 130, and a third location curve 135 between the third base station 130 and the first base station 110 in FIG. 1. A closed surface defined by the three location curves 115, 125 and 135 is a candidate region where the terminal is located. Ideally, the three location curves 115, 125 and 135 intersect one another at one point. However, because a signal propagation delay may occur due to a non-line-of-sight (NLOS) environment or other parameter, the tag signal arrival time may not reflect an accurate distance. Thus, a candidate region with an area is defined as illustrated in FIG. 1. Thereafter, in consideration of the signal propagation delay, the virtual location of the terminal is determined in the candidate region.

An algorithm for determining the virtual location of the terminal according to an exemplary embodiment of the present invention will be described below.

First, a measured propagation time of the tag signal can be expressed as Equation (2):

$$r = f(X) + n \quad (2)$$

where r denotes a measured propagation time of the tag signal, f(X) denotes an accurate signal propagation time, and n denotes measurement errors. Herein, X is the actual location of the terminal as represented by coordinates $[x\ y]^T$ of the terminal and the accurate signal propagation time f(X) is {the distance between the terminal and the base station}/{the speed of light}.

When three base stations are used as illustrated in FIG. 1, each of the variables in Equation (2) is a 3-element vector, which can be arranged to solve for a measurement error as Equation (3):

$$N = R - F(X) \quad (3)$$

where R denotes a measured propagation time vector of the tag signal, F(X) denotes an accurate signal propagation time vector and N denotes a measurement error vector.

Here, the location where the sum of squares of the measurement errors is minimal is determined as the virtual location of the terminal. The sum of squares of the measurement errors can be expressed as Equation (4):

$$\epsilon(X) = [R - F(X)]^T W [R - F(X)]^T \quad (4)$$

where $\epsilon(X)$ denotes a measurement error square vector, R denotes a measured propagation time vector of the tag signal, F(X) denotes an accurate signal propagation time vector and W denotes a weight matrix.

In Equation (4), the weight matrix W is a weight matrix for the measurement errors of the respective base stations, which is used to reduce a difference between the virtual location and the actual location. By selecting W suitably, the virtual location is determined to be close to the actual location. Herein, the tag signal received from the base station is expressed as the sum of multi-path delayed signals. The distribution of delays of the respective paths, that is, a multi-path delay spread affects the range of the measurement error. Therefore, the present invention determines the weight matrix W using the root mean square (RMS) of the multi-path delay spread of the tag signal. The RMS of the multi-path delay spread can be calculated as Equation (5):

$$\tau_{rms} = \sqrt{\frac{\sum_i P_i (\tau_i - \tau_m)^2}{\sum_i P_i}} \quad (5)$$

where $\tau_{rms}$ denotes the RMS of the multi-path delay spread, $P_i$ denotes the power of a signal received through the $i^{th}$ path, $\tau_i$ denotes the relative delay of the $i^{th}$ path with respect to a reference time, and $\tau_m$ denotes the mean excess delay.

The mean excess delay $\tau_m$ can be calculated as Equation (6):

$$\tau_m = \frac{\sum_i P_i \cdot \tau_i}{\sum_i P_i} \quad (6)$$

where $\tau_m$ denotes the mean excess delay, $P_i$ denotes the power of a signal received through the $i^{th}$ path, and $\tau_i$ denotes the relative delay of the $i^{th}$ path with respect to a reference time.

The location server 150 or each of the base stations 110, 120 and 130 calculates the RMS of each tag signal using Equations (5) and (6), and the location server 150 determines the weight matrix W using the calculated RMS values as Equation (7):

$$W = diag\{\tau_{rms,1}, \tau_{rms,2}, \tau_{rms,3}, \ldots, \tau_{rms,M}\}^{-1} \quad (7)$$

where W denotes the weight matrix of measurement errors, and $\tau_{rms,m}$ denotes the RMS of a tag signal received by the $m^{th}$ base station.

Using the Taylor series, the F(X) can be approximated to the first-order differential components as Equation (8):

$$F(X) \approx F(X_0) + G(X - X_0) \quad (8)$$

where F(X) denotes an actual propagation delay time vector, $F(X_0)$ denotes a signal propagation time at a reference location $X_0$, and G denotes the Jacobian matrix of F(X).

The Jacobian matrix G can be expressed as Equation (9):

$$G = \begin{bmatrix} \frac{\partial f_1}{\partial x_1} \bigg| X = X_0 & \cdots & \frac{\partial f_1}{\partial x_p} \bigg| X = X_0 \\ \vdots & \cdots & \vdots \\ \frac{\partial f_M}{\partial x_1} \bigg| X = X_0 & \cdots & \frac{\partial f_M}{\partial x_p} \bigg| X = X_0 \end{bmatrix} \quad (9)$$

where $x_p$ denotes the $p^{th}$ element of X, and $$\frac{\partial f_m}{\partial x_p} \bigg| X = X_0$$

denotes the partial differentiation of $f_m$ with respect to $x_p$ for $X = X_0$.

After the approximation of the F(X) using Equations (8) and (9), the value of X for minimizing the value of (X) can be calculated as Equation (10):

$$X' = X_0 + (G^T W G)^{-1} G^T W [R - F(X_0)] \quad (10)$$

where X' denotes the virtual location of the terminal, $X_0$ denotes a reference location, G denotes the Jacobian matrix of F(X), W denotes a weight matrix, R denotes a measured propagation time vector of the tag signal and $F(X_0)$ denotes a signal propagation time at the reference location $X_0$.

After the virtual location of the terminal is determined using Equation (10), the location server 150 predicts the tag signal arrival time of each base station with respect to the determined virtual location. That is, the location server 150 predicts the time for each base station to receive the tag signal, on the assumption that the terminal has transmitted the tag signal at the virtual location. The predicted tag signal arrival time is compared with a measured tag signal arrival time. If a difference between the two time data is less than or equal to a threshold value, the virtual location is determined as the final location. On the other hand, if the difference between the two time data is greater than the threshold value, another virtual location is determined using Equation (10). That is, the virtual location is redetermined by substituting the X' for the $X_0$ in Equation (10). Accordingly, Equation (10) can be rearranged as Equation (11):

$$X^{(n)} = X^{(n-1)} + (G^T W G)^{-1} G^T W [R - F(X^{(n-1)})] \quad (11)$$

where $X^{(n)}$ denotes the $n^{th}$ virtual location of the terminal, $X^{(n-1)}$ denotes the $(n-1)^{th}$ virtual location of the terminal, G denotes the Jacobian matrix of F(X), W denotes a weight matrix, R denotes a measured propagation time vector of the tag signal, and $F(X_0)$ denotes a signal propagation time at the reference location $X_0$.

The redetermination of the virtual location is repeated until the difference between the time data becomes less than the threshold value, thereby estimating the final location of the terminal.

Hereinafter, a detailed description is given of exemplary constructions and operations of a terminal, a base station, and a location server for performing the above-described algorithm.

Figure 2:
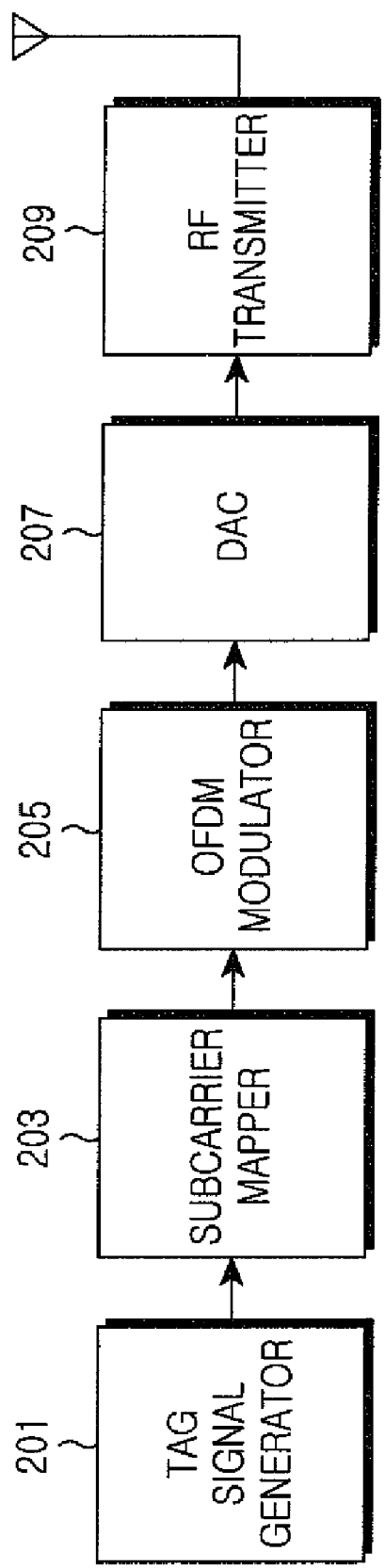
FIG. 2 is a block diagram of a terminal in a broadband wireless communication system according to an exemplary embodiment of the present invention.

FIG. 2 is a block diagram of a terminal in a broadband wireless communication system according to an exemplary embodiment of the present invention.

Referring to FIG. 2, the terminal includes a tag signal generator 201, a subcarrier mapper 203, an OFDM modulator 205, a Digital-to-Analog Converter (DAC) 207, a radio frequency (RF) transmitter 209 and an antenna.

Using Bark codes, the tag signal generator 201 modulates a unique sequence, given for identification of the terminal, to output the resulting signal continuously. The subcarrier mapper 203 maps a tag signal, received from the tag signal generator 201, to a DC subcarrier. The OFDM modulator 205 Inverse Fast Fourier Transform (IFFT)-processes frequency-mapped signals, received from the subcarrier mapper 203, into a time-domain signal to generate an OFDM symbol. The DAC 207 converts a digital signal, received from the OFDM modulator 205, into an analog signal. The RF transmitter 209 converts and amplifies a baseband signal, received from the DAC 207, into an RF signal to transmit the RF signal through the antenna.

Figure 3:
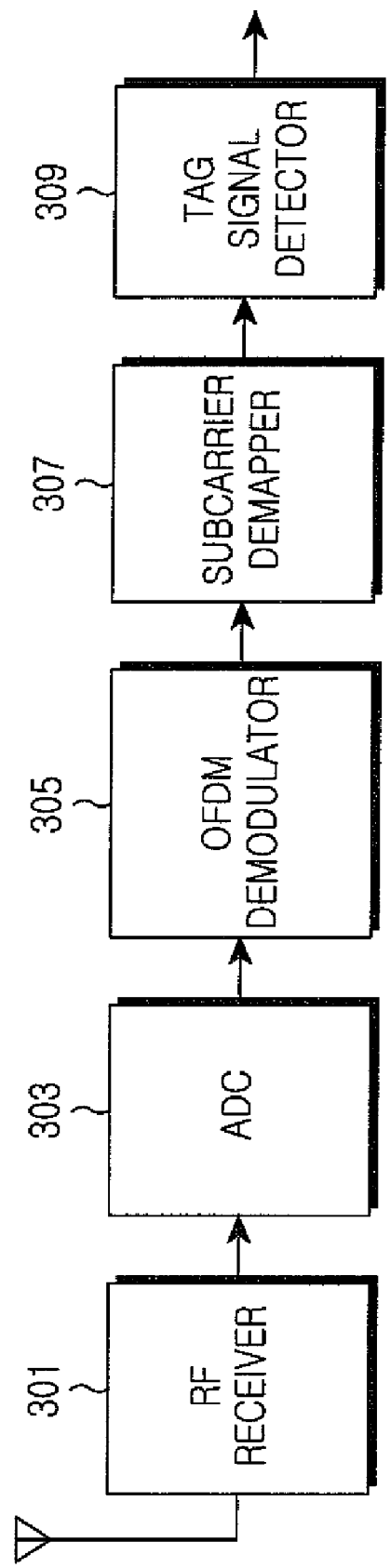
FIG. 3 is a block diagram of a base station in a broadband wireless communication system according to an exemplary embodiment of the present invention.

FIG. 3 is a block diagram of a base station in a broadband wireless communication system according to an exemplary embodiment of the present invention.

Referring to FIG. 3, the base station includes an antenna, an RF receiver 301, an Analog-to-Digital Converter (ADC) 303, an OFDM demodulator 305, a subcarrier demapper 307 and a tag signal detector 309.

The RF receiver 301 amplifies and converts an RF signal, received through the antenna, into a baseband signal. The ADC 303 converts an analog signal, received from the RF receiver 301, into a digital signal. The OFDM demodulator 305 Fast Fourier Transform (FFT)-processes a time-domain OFDM symbol, received from the ADC 303, into frequency-domain subcarrier signals.

The subcarrier demapper 307 demaps subcarrier signals, received from the OFDM demodulator 305 into original signals. According to an exemplary embodiment of the present invention, the subcarrier demapper 307 outputs a tag signal, mapped to a DC subcarrier, to the tag signal detector 309.

The tag signal detector 309 demodulates a tag signal, received from the subcarrier demapper 307, using Bark codes to detect to which terminal the tag signal belongs and to detect information about the arrival time of the tag signal. Herein, the arrival time information of the tag signal is transmitted to the location server. Also, the tag signal detector 309 measures the multi-path delay spread RMS of the tag signal. Herein, the arrival time information and the RMS information of the tag signal are provided to the location server.

Figure 4:
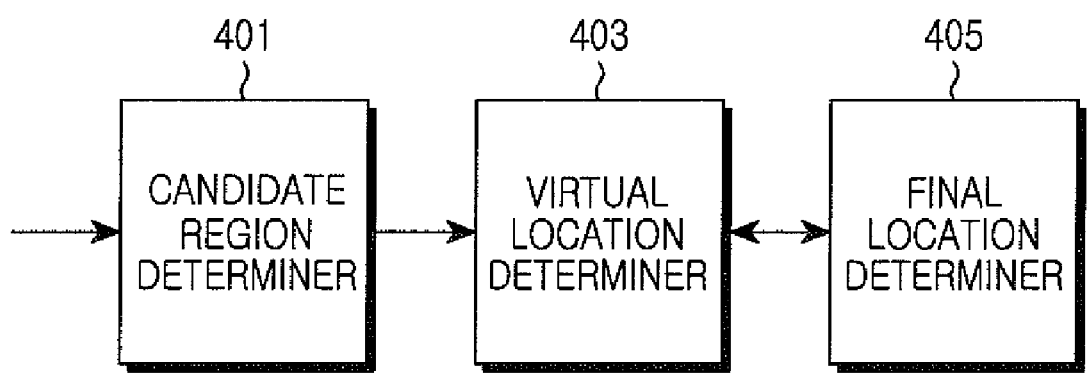
FIG. 4 is a block diagram of a location server in a broadband wireless communication system according to an exemplary embodiment of the present invention.

FIG. 4 is a block diagram of a location server in a broadband wireless communication system according to an exemplary embodiment of the present invention.

Referring to FIG. 4, the location server includes a candidate region determiner 401, a virtual location determiner 403 and a final location determiner 405.

The candidate region determiner 401 collects the arrival time information of a tag signal from tag readers (e.g., base stations), which have received the tag signal from the terminal, to determine a candidate region for the location of the terminal. That is, the candidate region determiner 401 pairs the base stations providing the arrival time information and calculates a tag signal arrival time difference between each pair of the base stations. Using the tag signal arrival time difference, the candidate region determiner 401 calculates a location curve for each pair of the base stations as Equation (1) to determine the candidate region. For example, if the tag signal arrival time information is received from three base stations, three location curves are calculated as illustrated in FIG. 1 and a closed surface defined by the location curves is determined as the candidate region.

The virtual location determiner 403 determines a virtual location at which the terminal is expected to be located in the candidate region. That is, using Equation (10), the virtual location determiner 403 determines a virtual location with respect to a reference location X0. Also, if the final location determiner 405 does not determine that the virtual location is the final location, another virtual location is determined using the virtual location. That is, the virtual location is redetermined using Equation (11).

The final location determiner 405 receives the virtual location information from the virtual location determiner 403 to determine whether the virtual location is the final location. That is, the final location determiner 405 predicts the tag signal arrival time of each base station for the virtual location and compares the predicted tag signal arrival time with a measured tag signal arrival time. For example, an accurate signal propagation time is calculated by dividing the distance between the base station and the virtual location by the speed of light and the tag signal arrival time for the virtual location is predicted using the calculated accurate signal propagation time. If a difference between the two time data is less than or equal to a threshold value, the virtual location is determined as the final location. On the other hand, if the difference between the two time data is greater than the threshold value, the virtual location determiner 403 is controlled to redetermine the virtual location. The redetermination of the virtual location is repeated until the virtual location is determined as the final location.

Figure 5:
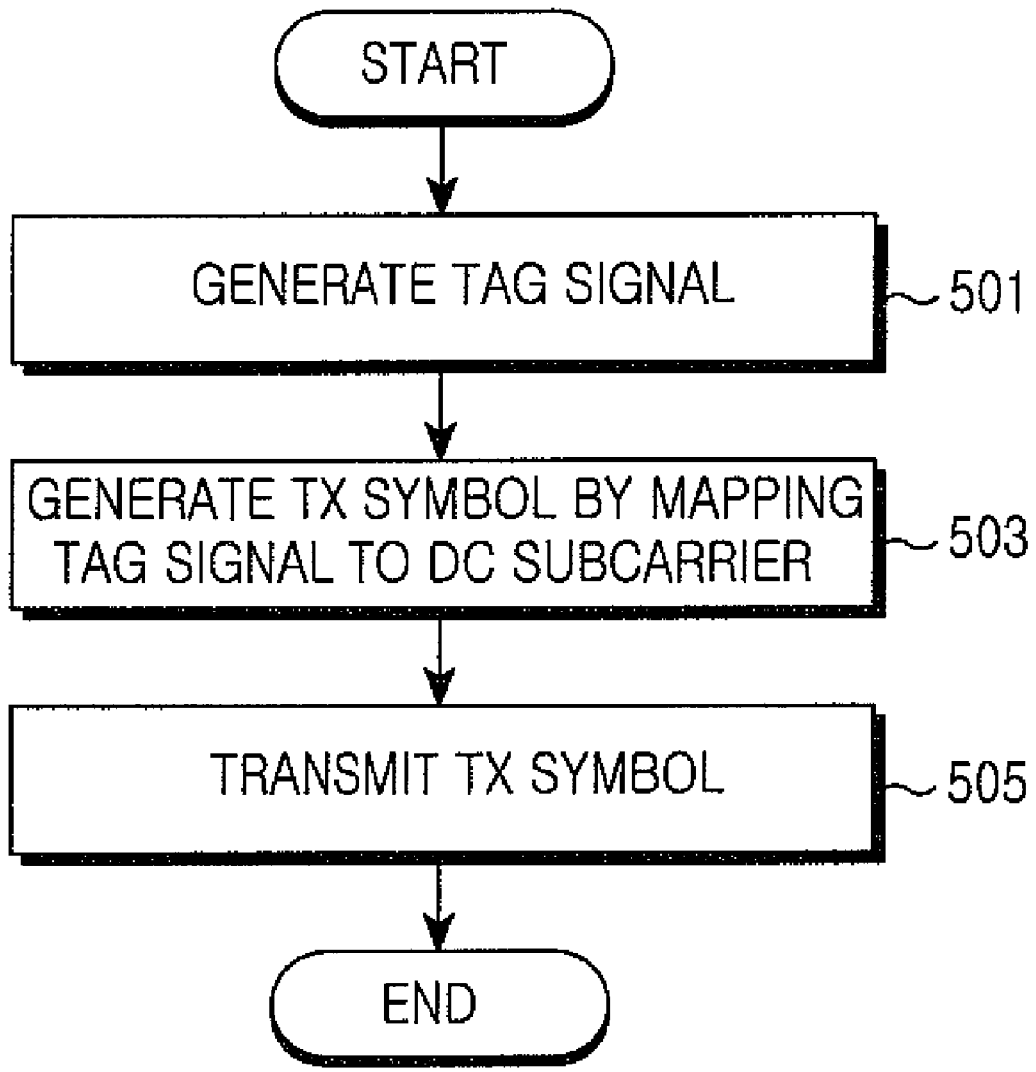
FIG. 5 is a flowchart illustrating a procedure for a terminal to transmit a tag signal in a broadband wireless communication system according to an exemplary embodiment of the present invention.

FIG. 5 is a flowchart illustrating a procedure for a terminal to transmit a tag signal in a broadband wireless communication system according to an exemplary embodiment of the present invention.

Referring to FIG. 5, the terminal generates a tag signal in step 501. That is, using Bark codes, the terminal modulates a unique sequence that is given for identification of the terminal.

In step 503, the terminal generates a TX symbol by using a DC subcarrier carrying the tag signal. That is, the tag signal is mapped to a DC subcarrier to generate a TX symbol.

In step 505, the terminal transmits the TX symbol to the corresponding base station. At this point, the tag signal is broadcast so that a plurality of base stations can receive the tag signal.

Figure 6:
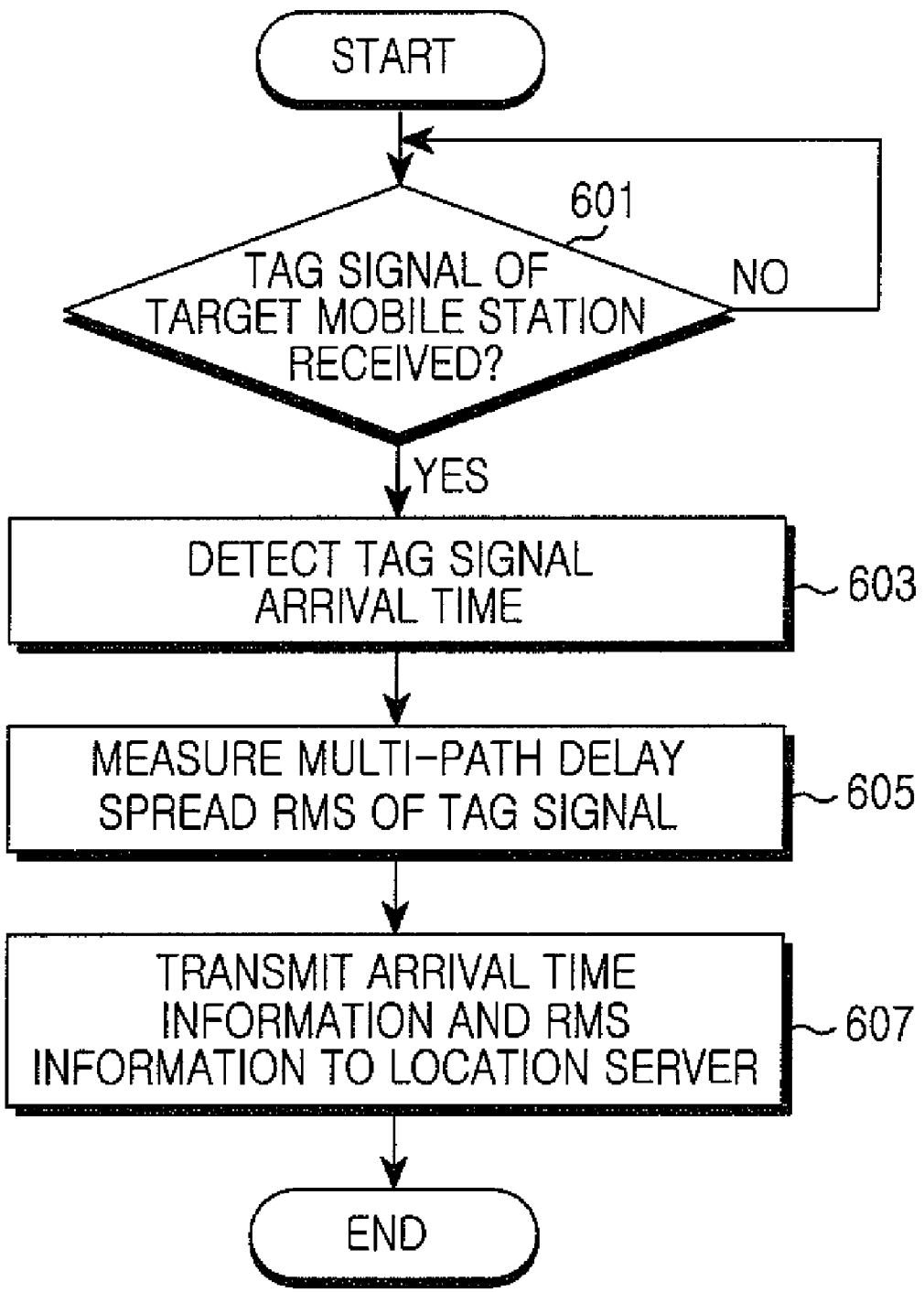
FIG. 6 is a flowchart illustrating a procedure for a base station to detect a tag signal in a broadband wireless communication system according to an exemplary embodiment of the present invention.

FIG. 6 is a flowchart illustrating a procedure for a base station to detect a tag signal in a broadband wireless communication system according to an exemplary embodiment of the present invention.

Referring to FIG. 6, in step 601, the base station determines whether a tag signal is received from a target terminal that is to be located. For example, a tag signal carried by a DC subcarrier is demodulated by Bark codes to determine whether the tag signal is a tag signal of the target terminal.

If the tag signal is received from the target terminal, the procedure proceeds to step 603. In step 603, the base station detects the arrival time of the received tag signal.

In step 605, the base station measures the multi-path delay spread RMS of the tag signal. For example, the multi-path delay spread RMS is calculated using Equations (5) and (6).

In step 607, the base station transmits the arrival time information and the RMS information of the tag signal to the location server.

Figure 7:
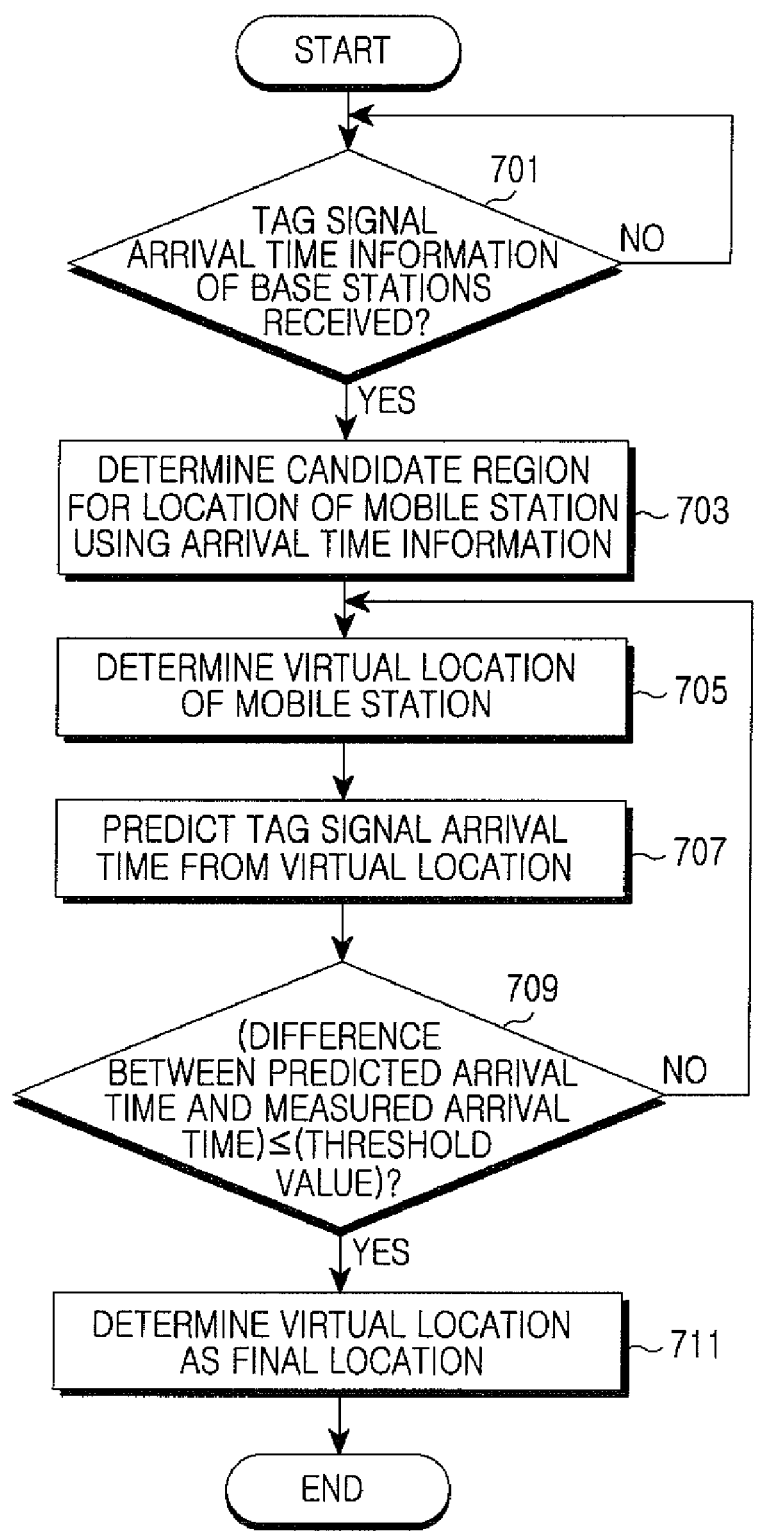
FIG. 7 is a flowchart illustrating a procedure for a location server to locate a terminal in a broadband wireless communication system according to an exemplary embodiment of the present invention.

FIG. 7 is a flowchart illustrating a procedure for a location server to locate a terminal in a broadband wireless communication system according to an exemplary embodiment of the present invention.

Referring to FIG. 7, in step 701, the location server determines whether the tag signal arrival time information (t1, t2, t3) is received from the base stations that have received the tag signal from the target terminal. At this point, the location server must collect the tag signal arrival time information from at least three or more base stations in order to locate the target terminal.

If the tag signal arrival time information is collected from the base stations, the procedure proceeds to step 703. In step 703, using the collected tag signal arrival time information, the location server determines a candidate region for the location of the terminal. For example, the location server calculates a tag signal arrival time difference between each pair of base stations and calculates location curves using Equation (1). For example, a closed surface defined by the location curves is determined as the candidate region.

In step 705, the location server determines a virtual location of the terminal in the candidate region. For example, the virtual location of the terminal is determined using Equation (10).

In step 707, the location server predicts the tag signal arrival time from the virtual location. That is, if the terminal has transmitted the tag signal at the virtual location, the location server predicts the time for each base station to receive the tag signal. For example, an accurate signal propagation time is calculated by dividing the distance between each base station and the virtual location by the speed of light and the tag signal arrival time (t1', t2', t3') for the virtual location is predicted using the calculated accurate signal propagation time.

In step 709, the location server compares the predicted tag signal arrival time (t1', t2', t3') with the measured tag signal arrival time (t1, t2, t3) to determine whether a difference between the two time data is less than or equal to a threshold value. That is, the location server determines whether the sum of the tag signal arrival time differences (t1−t1', t2−t2', t3−t3') for the respective base stations is less than or equal to a threshold value.

If the difference between the two time data is greater than the threshold value, the procedure returns to step 705. In step 705, the location server redetermines the virtual location. For example, the virtual location is redetermined using Equation (11).

On the other hand, if the difference between the two time data is less than or equal to the threshold value, the procedure proceeds to step 711. In step 711, the location server determines the current virtual location as the final location.

As described above, the location of a terminal can be estimated using the DC subcarrier-carried tag signal transmitted by the terminal. The tag signal can be used not only for the location estimation but also for various services using a Radio Frequency IDentification (RFID). For example, an automatic highway tollgate service can be provided by equipping a highway tollgate with a device capable of detecting the tag signal.

Also, the tag signal arrival time is measured accurately in consideration of the tag signal propagation delay. Thus, the accurate location of terminal can be estimated without using additional equipment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for locating a terminal in a wireless communication system, the apparatus comprising:
 a candidate region determiner for determining a candidate region of a terminal by using tag signal arrival time information of the terminal provided from a plurality of readers;
 a virtual location determiner for determining a virtual location of the terminal in the candidate region in consideration of a reference location and a propagation delay of the tag signal; and
 a final location determiner for predicting a tag signal arrival time from the virtual location and for determining the virtual location as the final location if a difference between the predicted tag signal arrival time and a measured tag signal arrival time is less than or equal to a threshold value,
 wherein the virtual location determiner determines a new virtual location by using the virtual location as the reference location when the difference between the predicted tag signal arrival time and the measured tag signal arrival time is greater than the threshold value.

2. The apparatus of claim 1, wherein the candidate region determiner establishes pairs of readers from the plurality of readers, calculates a signal arrival time difference between each pair of readers, calculates a plurality of location curves using the calculated signal arrival time differences and determines a closed surface defined by the location curves as the candidate region.

3. The apparatus of claim 1, wherein the virtual location determiner determines the virtual location using the following equation:

$$X'=X_0+(G^TWG)^{-1}G^TW[R-F(X_0)]$$

where X' denotes the virtual location of the terminal, $X_0$ denotes a reference location, G denotes the Jacobian matrix of F(X), W denotes a weight matrix, R denotes a measured propagation time vector of the tag signal and $F(X_0)$ denotes a signal propagation time at the reference location $X_0$.

4. The apparatus of claim 3, wherein the virtual location determiner calculates the weight vector using the following equation:

$$W=diag\{\tau_{rms,1},\tau_{rms,2},\tau_{rms,3},\ldots,\tau_{rms,M}\}^{-1}$$

where W denotes the weight matrix and $\tau_{rms,m}$ denotes the root mean square (RMS) of the tag signal received by the $m^{th}$ reader.

5. The apparatus of claim 1, wherein the final location determiner calculates an accurate signal propagation time by dividing the distance between the virtual location and each of the plurality of readers by the speed of light and predicts the tag signal arrival time from the virtual location using the accurate signal propagation time.

6. The apparatus of claim 1, wherein the virtual location determiner determines the new virtual location using the following equation:

$$X^{(n)}=X^{(n-1)}+(G^TWG)^{-1}G^TW[R-F(X^{(n-1)})]$$

where $X^{(n)}$ denotes the $n^{th}$ virtual location of the terminal, $X^{(n-1)}$ denotes the $(n-1)^{th}$ virtual location of the terminal, G denotes the Jacobian matrix of F(X), W denotes the weight matrix, R denotes a measured propagation time vector of the tag signal and $F(X_0)$ denotes a signal propagation time at the reference location $X_0$.

7. A method for locating a terminal in a wireless communication system, the method comprising:
- determining a candidate region of the terminal by using tag signal arrival time information of the terminal provided from a plurality of readers;
- determining a virtual location of the terminal in the candidate region in consideration of a reference location and a propagation delay of the tag signal;
- predicting a tag signal arrival time from the virtual location;
- calculating a difference between the predicted tag signal arrival time and a measured tag signal arrival time;
- determining the virtual location as the final location if the difference between the predicted tag signal arrival time and the measured tag signal arrival time is less than or equal to a threshold value; and
- determining a new virtual location by using the virtual location as the reference location when the difference between the predicted tag signal arrival time and the measured tag signal arrival time is greater than the threshold value.

8. The method of claim 7, wherein the determining of the candidate region comprises:
- establishing pairs of readers from the plurality of readers and calculating a signal arrival time difference between each pair of readers;
- calculating a plurality of location curves using the calculated signal arrival time differences; and
- determining a closed surface defined by the location curves as the candidate region.

9. The method of claim 7, wherein the virtual location is determined using the following equation:

$$X' = X_0 + (G^T W G)^{-1} G^T W [R - F(X_0)]$$

where X' denotes the virtual location of the terminal, $X_0$ denotes a reference location, G denotes the Jacobian matrix of F(X), W denotes a weight matrix, R denotes a measured propagation time vector of the tag signal and $F(X_0)$ denotes a signal propagation time at the reference location $X_0$.

10. The method of claim 9, wherein the weight vector is calculated using the following equation:

$$W = diag\{\tau_{rms,1}, \tau_{rms,2}, \tau_{rms,3}, \ldots, \tau_{rms,M}\}^{-1}$$

where W denotes the weight matrix, and $\tau_{rms,m}$ denotes the root mean square (RMS) of the tag signal received by the $m^{th}$ reader.

11. The method of claim 7, further comprising:
- determining an accurate signal propagation time by dividing the distance between the virtual location and each of the readers by the speed of light; and
- predicting the tag signal arrival time from the virtual location using the accurate signal propagation time.

12. The method of claim 7, wherein the new virtual location is determined using the following equation:

$$X^{(n)} = X^{(n-1)} + (G^T W G)^{-1} G^T W [R - F(X^{(n-1)})]$$

where $X^{(n)}$ denotes the $n^{th}$ virtual location of the terminal, $X^{(n-1)}$ denotes the $(n-1)^{th}$ virtual location of the terminal, G denotes the Jacobian matrix of F(X), W denotes the weight matrix, R denotes a measured propagation time vector of the tag signal, and $F(X_0)$ denotes a signal propagation time at the reference location $X_0$.

13. A wireless communication system comprising:
- a terminal for transmitting a TX signal generated by mapping a tag signal to a direct current (DC) subcarrier;
- a plurality of readers for receiving the TX signal to detect the tag signal mapped to the DC subcarrier and to detect the arrival time of the tag signal; and
- a location unit for determining a candidate region of the terminal by using a reference location and tag signal arrival time information provided from the readers, for predicting a tag signal arrival time from a virtual location in the candidate region and for determining the virtual location as the final location if a difference between the predicted tag signal arrival time and a measured tag signal arrival time is less than or equal to a threshold value and for determining a new virtual location by using the virtual location as the reference location when the difference between the predicted tag signal arrival time and the measured tag signal arrival time is greater than the threshold value.

14. The wireless communication system of claim 13, wherein the terminal modulates the tag signal by Bark codes and maps the resulting signal to the DC subcarrier, and each of the plurality of readers detect the tag signal by Bark-code-demodulating a signal extracted from the DC subcarrier.

15. The wireless communication system of claim 13, wherein the location unit determines the virtual location using the following equation:

$$X' = X_0 + (G^T W G)^{-1} G^T W [R - F(X_0)]$$

where X' denotes the virtual location of the terminal, $X_0$ denotes a reference location, G denotes the Jacobian matrix of F(X), W denotes a weight matrix, R denotes a measured propagation time vector of the tag signal, and $F(X_0)$ denotes a signal propagation time at the reference location $X_0$.

16. The wireless communication system of claim 15, wherein each of the plurality of readers measures the root mean square of a multi-path delay spread of the tag signal and the location unit calculates the weight matrix using the multi-path delay spread of the tag signal.

* * * * *